United States Patent
Wilson

[19]

[11] Patent Number: 5,572,481
[45] Date of Patent: *Nov. 5, 1996

[54] EFFICIENT LOCAL-BUS ROM MEMORY FOR MICROPROCESSOR SYSTEMS

[75] Inventor: Thomas J. Wilson, Pleasanton, Calif.

[73] Assignee: LSI Logic Corporation, Milpitas, Calif.

[*] Notice: The term of this patent shall not extend beyond the expiration date of Pat. No. 5,477,503.

[21] Appl. No.: 466,809

[22] Filed: Jun. 6, 1995

Related U.S. Application Data

[63] Continuation of Ser. No. 132,726, Oct. 5, 1993, Pat. No. 5,477,503.

[51] Int. Cl.⁶ .................................................. G11C 8/02
[52] U.S. Cl. ........................ 365/231; 365/103; 365/230.03
[58] Field of Search ............................. 365/231, 230.03, 365/103; 395/429

[56] References Cited

U.S. PATENT DOCUMENTS 5,040,153  8/1991  Fung et al. ................................ 365/231
5,477,503  12/1995  Wilson ..................................... 365/231

FOREIGN PATENT DOCUMENTS 0246196  10/1987  Japan ..................................... 365/231

Primary Examiner—Son T. Dinh
Attorney, Agent, or Firm—Katz & Cotton, LLP

[57] ABSTRACT

An efficient technique or providing ROM memory on a microprocessor local bus is described whereby a ROM and all necessary address decoding and control circuitry is incorporated in a single integrated circuit. By doing this, only one chip is required to add ROM to a microprocessor local bus, saving considerable space and power over discrete implementations. The ROM is implemented in a wide memory format, matching the bus width of the microprocessor to which it is connected. This permits full-speed access to the local bus ROM, and eliminates any need for such techniques as ROM "shadowing".

4 Claims, 2 Drawing Sheets

EFFICIENT LOCAL-BUS ROM MEMORY FOR MICROPROCESSOR SYSTEMS

This is a continuation of application Ser. No. 08/132,726, filed Oct. 5, 1993, now U.S. Pat. No. 5,477,503.

TECHNICAL FIELD OF THE INVENTION

The invention relates to microprocessor-based systems, and more particularly to providing ROM memory for microprocessor-based systems.

BACKGROUND OF THE INVENTION

Most microprocessor-based systems incorporate some form of ROM (Read-Only Memory) as a part of their basic memory system. Among other purposes, ROMs serve as "start-up" memory for a microprocessor system. Many large microprocessor-based systems rely on a disk drive or other mass-storage medium for storage of the bulk of their programming. These systems provide RAM (Random Access Memory) so that programs stored on disk may be copied into RAM for execution. However, RAM memory is volatile, that is, it does not retain its contents after power is removed. Hence, such systems provide at least a small amount of "boot" ROM for system startup and basic system services (e.g., low-level device drivers, etc.).

Today's microprocessor systems tend, in increasing numbers, to be based upon wide-bus microprocessors, such as the Intel 80386 and 80486, and the Motorola 68040 microprocessors. These processors have 32 bit wide data and address buses. Most ROMs, however, come in 8 bit wide increments, for example, 32K×8 or 128K×8 (where 1K=1024). In order to provide ROM for wide bus microprocessors, it is necessary to either provide enough ROMs to cover the entire data bus width, (e.g., providing 128K bytes of memory in four 32K×8 ROMs, organized as a 32K×32 memory array) or to provide "byte funneling" or bus-width adaptation circuitry to interface between the wide-bus microprocessor and the relatively narrower bus of the ROM. In addition, address selection circuitry is required so that the ROM responds only to a specific set of addresses. Unfortunately, the economics of ROM memory chips are such that four 32K×8 ROMs are considerably more expensive than a single 128K×8 ROM, even though they provide the same amount of storage. This leads many system designers to opt for the cheaper memory and to provide bus-width adaptation.

In either case, a number of semiconductor device packages must be employed to incorporate ROM onto the local bus (i.e., directly connected to the microprocessor's unbuffered address, data, and control signals) of a wide bus microprocessor. If multiple individual ROM chips are used to provide a wide-format memory matched to the width of the microprocessor bus, then board space is required for those chips, and address decoding circuitry is still required. If a single ROM is used, then additional circuitry must be provided to adapt the bus width of the relatively narrow ROM to the wide bus width of the microprocessor.

A typical prior-art system of this type is shown in FIG. 1. A wide bus microprocessor (μP) 105, such as the Intel Corp. 80486DX microprocessor, has an "n" bit local address bus 115, an "n" bit local data bus 120, and a local control bus 125 comprising a number of bus-control signals such as read and write strobe signals, etc., where "n" is equal to 32 for the Intel 80486DX. On a larger system, large numbers of peripheral devices and/or large amounts of memory may be expected to be attached to the microprocessor. In order to prevent the microprocessor's pin drivers (the circuits that drive the bus signals at each pin of the microprocessor) from becoming overloaded, an external bus interface 130 is provided. The external bus interface includes high-current driver chips capable of handling the relatively large signal loads imposed by large numbers of peripheral devices. Sometimes an external bus interface will impose "wait states" or idle cycles to be inserted into external bus activity so that external bus signals have adequate time to stabilize before they are used.

A single 128K×8 ROM memory 150 is interface to the microprocessor's (105) local bus via interface logic 140. The bus interface logic 140 interfaces with the microprocessor 105 address bus 115, data bus 120 and control signals 125, and provides an adapted 8 bit data bus 155, 17 bit address bus 160 and control signals 165 to the ROM.

When the microprocessor 105 attempts to read a 32-bit data word from the 8-bit wide ROM 150, the interface logic 140 must perform four 8 bit reads to consecutive addresses in the ROM 150, and assemble the four 8 bit responses into a 32-bit data word. This slows the microprocessor considerably when accessing the ROM memory.

In many modern PC systems, the external bus interface (e.g., 130) conforms to a specification commonly known as the "ISA" or Industry Standard Architecture. The ISA standard and similar bus interfaces include the aforementioned byte-gathering as a part of their standard functionality so that 8-bit peripherals and memory cards may be interfaced to wide-bus microprocessors. As a result, it is common practice to interface a BIOS ROM (e.g., 150) directly to the 8 bit interface within the external bus interface rather than to a dedicated interface circuit (e.g. 140), effectively placing the ROM on the external bus. Since external buses typically operate at lower speeds than local buses, (due in part to propagation delays in the external bus interface) this makes accesses to the ROM even slower than previously described.

In order to offset the effects of this slow ROM access, programmers will often copy the contents of a ROM into another high-speed local RAM memory and re-direct all calls to the ROM software over to the copies of the ROM software in RAM. This is known as ROM "shadowing". While this technique works, it ties up RAM memory space and complicates the design of both hardware and software.

DISCLOSURE OF THE INVENTION

It is therefore an object of the present invention to provide a technique for efficiently implementing ROM on a microprocessor local bus.

It is a further object of the present invention to eliminate interface logic for connecting ROM to a microprocessor local bus.

It is a further object of the present invention to minimize the number of semiconductor device packages required to implement ROM on a microprocessor local bus.

It is a further object of the present invention to accomplish the above objects while eliminating the delays associated with extra bus cycles due to bus adaptation.

According to the invention, a "local" bus ROM is provided which is matched to the width of the microprocessor's local bus, and which integrates the address selection function. The local-bus ROM is a single chip device comprising a ROM functional block, a programmable address, preferably provided by ROM cells, means for programming the programmable address, and an address decode and select functional block on the integrated circuit. The address decode and select functional block compares a portion of the external address signal to the programmable address and monitors a set of external control signals, asserting an enable signal to the ROM only when the portion of the external address signal matches the programmable address and a pre-determined combination of external control signals occurs.

In one embodiment, the means for programming the programmable address is a ROM mask.

In another embodiment, ROM cells providing the programmable address are electrically programmable.

Another embodiment provides for an externally provided comparison address to be used in place of the programmable address.

By providing a single chip local-bus ROM which requires no peripheral circuitry to interface to a microprocessor, an extremely space-efficient means of connecting ROM to a microprocessor is provided.

In addition to minimizing space, this technique eliminates delays associated with extra bus cycles due to bus adaptation. The ROM is provided in a wide format directly compatible with single-cycle access by the microprocessor to which it is connected.

Other objects, features and advantages of the invention will become apparent in light of the following description thereof.

DETAILED DESCRIPTION OF THE INVENTION

Figure 1:
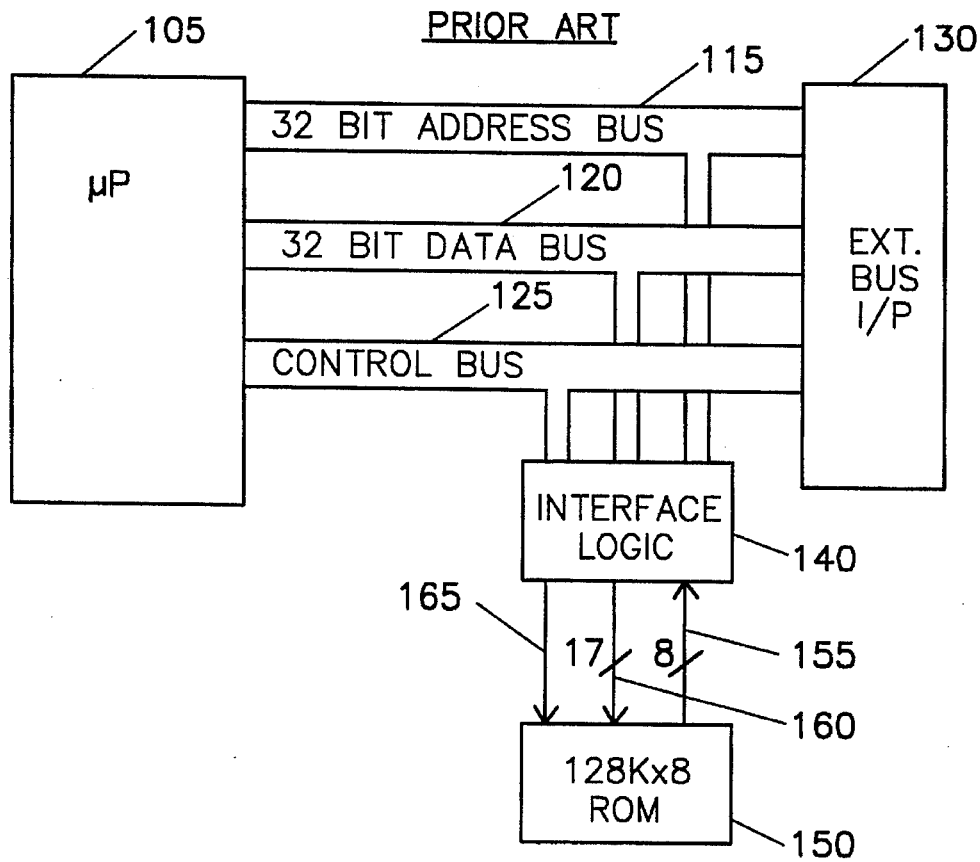
FIG. 1 is a block diagram of a prior-art microprocessor system which implements ROM memory on a local bus.
Figure 2:
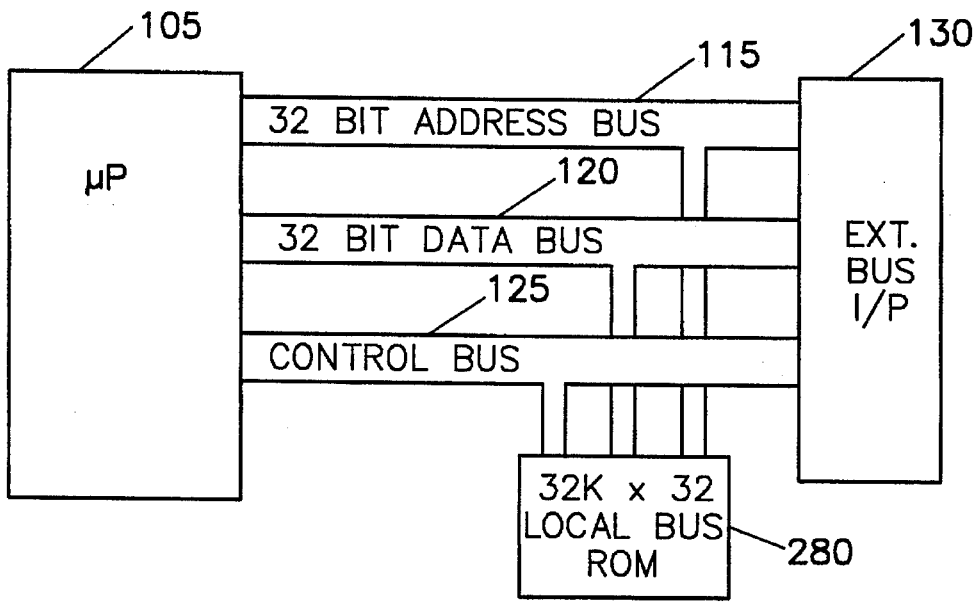
FIG. 2 is a block diagram of a local-bus ROM system according to the present invention.

FIG. 2 is a block diagram of a wide-bus microprocessor system incorporating a local bus memory 280, according to the present invention. In the Figure, the microprocessor 105, address bus 115, data bus 120, control signals 125, and external bus interface 130 are identical to those of FIG. 1. In this case, however, an integrated local bus ROM device 280 provides a single-chip wide-format (e.g., 32K×32 bit) ROM interfaced directly to the microprocessor's local address bus 115, local data bus, 120, and local control signals 125.

Figure 3A:
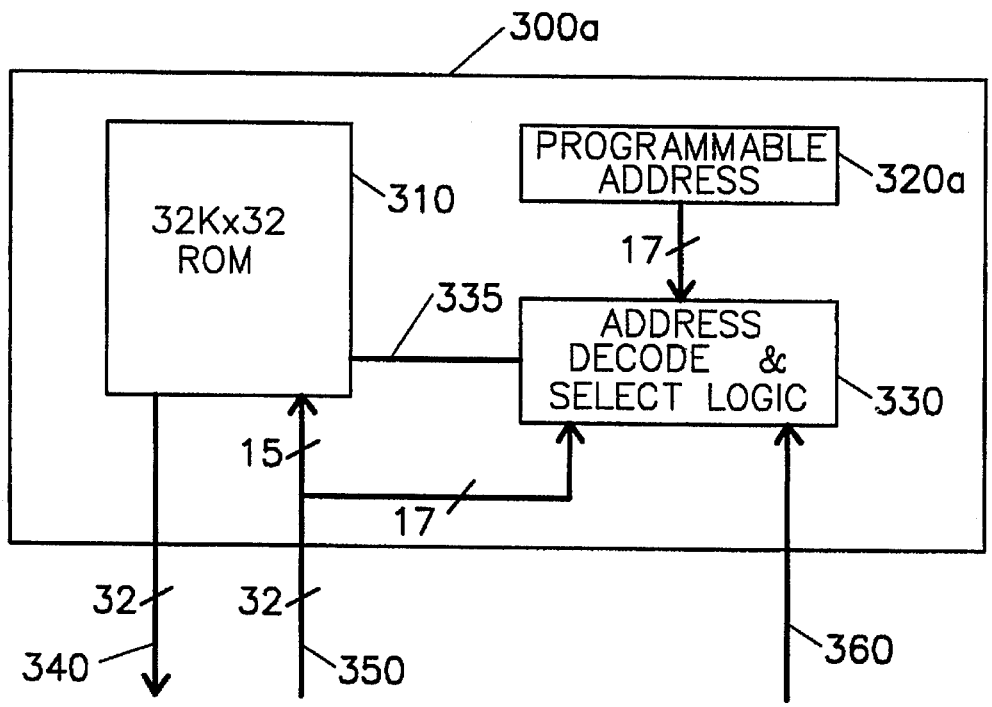
FIG. 3a is a block diagram a preferred embodiment of the present invention.

FIG. 3a is a block diagram of one embodiment of a single-chip local bus ROM 300a (see 280 with respect to FIG. 2), according to the present invention. In this embodiment, a 128K byte ROM 310 is provided in a 32K by 32 form factor providing a 32 bit-wide data bus 340 on the local bus ROM device 300a. A portion (15 bits) of a 32 bit address bus 350 is used to address the ROM 310. Another portion (the remaining 17 bits) of the address bus 350 is used by address decoding and select logic 330 to map the 128K byte ROM into the 32 bit address space, according to a programmable 17 bit address 320a. Preferably, the programmable address 320a is provided in the form of ROM cells, either electrically programmable (e.g. ultraviolet erasable PROM—Programmable Read Only Memory) or mask programmable. The address decode and select logic uses the programmable address in conjunction with the external address signals 350 and a set of external control signals 360 (e.g., read strobes) and generates an internal select signal 335 which enables the ROM only when the address is in a range corresponding to the programmable address 320a. In normal use, the local-bus ROM data bus 340 would connect to, e.g., local data bus 120 (FIG. 2). The local-bus ROM address bus 350 would connect to, e.g., local address bus 115 (FIG. 2). The external control signals 360 would connect to, e.g., local control signals 125 (FIG. 2).

Figure 3B:
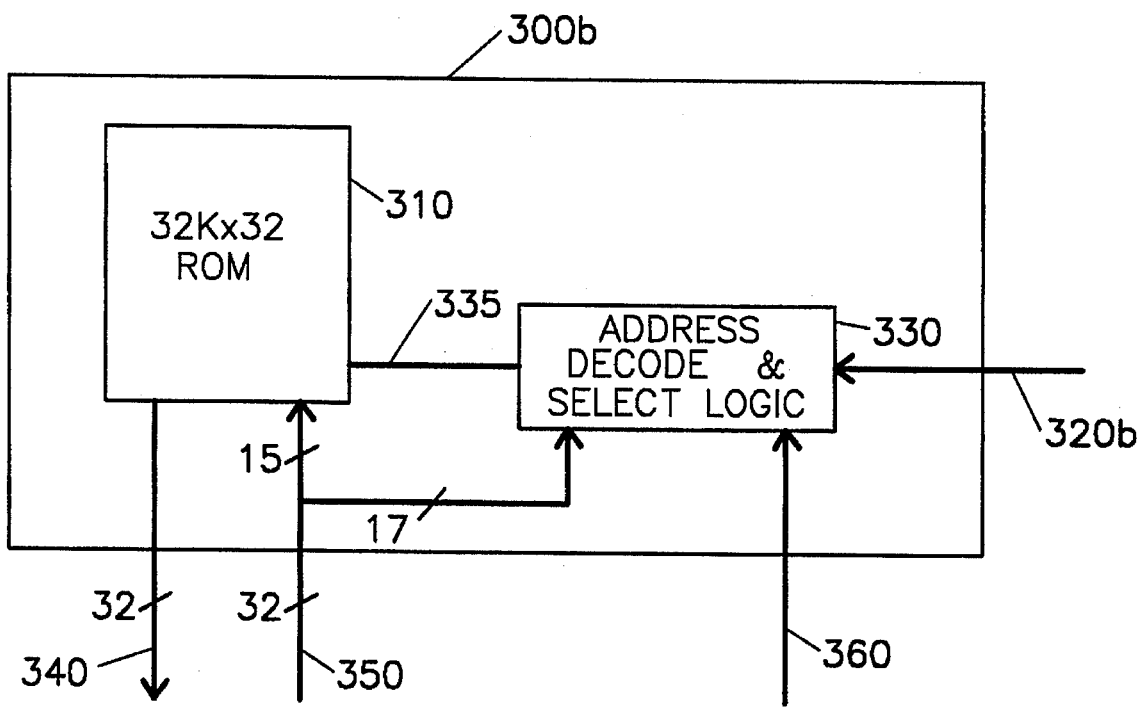
FIG. 3b is a block diagram of an alternate embodiment of the present invention.

FIG. 3b is a block diagram of an alternate embodiment of a single chip local bus ROM 300b according to the present invention. This embodiment is identical to that of FIG. 3a, except that rather than using a programmable address (320a) on-chip, an off-chip programmable address 320b is provided via pins of the local bus device 300b.

Since the ROM of the local bus ROM chip is provided in a wide format (i.e., matching the microprocessor's data bus width) no bus-width adaptation circuitry, either on or off chip, is required. As a result, no extra read cycles are performed. The size of the decode circuitry is trivial compared to the size of the ROM cell, and may readily be implemented on a single integrated circuit die with the ROM. By minimizing the number of chips, bus loading is minimized. By incorporating the address decode logic on-chip, the decode delays are shorter and the apparent speed of the ROM is faster than that of an equivalent ROM using external address decode circuitry. Assuming that the ROM is fast enough for full-speed, no wait-state access by the microprocessor, the need for ROM shadowing is eliminated.

Another benefit of the s ingle-chip local-bus ROM is that considerable power can be saved, as compared to a multichip discrete implementation of the same function.

This scheme is adaptable to any bus width or address width or control scheme, and provides a one-chip technique for implementing ROM on a microprocessor local bus.

What is claimed is:

1. A local bus read only memory for microprocessor systems, comprising:

an integrated circuit;

a read only memory on the integrated circuit, said read only memory having data outputs, first address inputs, and an enable signal input, said read only memory being operative to produce a data value on its data outputs corresponding to a first portion of an external address signal at its first address inputs when an enable signal is asserted;

a programmable address;

programmable address logic for programming the programmable address;

address decode and select logic on the integrated circuit;

comparison logic in the address decode and select logic for comparing a second portion of the external address signal to the programmable address;

monitoring logic in the address decode and select logic to detect a set of external control signals; and logic for asserting the enable signal when the second portion of the external address signal matches the programmable address and a pre-determined combination of external control signals occurs.

2. The apparatus of claim 1, wherein the programmable address is provided by a set of read only memory cells on the integrated circuit.

3. The apparatus of claim 1, wherein the programmable address logic is a read only memory mask.

4. The apparatus of claim 2, wherein the read only memory cells providing the programmable address are electrically programmable.

* * * * *